June 10, 1958  M. T. GOETZ ET AL  2,838,114
KEYBOARD PERFORATOR AND COUNTER FOR SETTING TABULAR MATTER
Filed Aug. 29, 1955  3 Sheets-Sheet 1
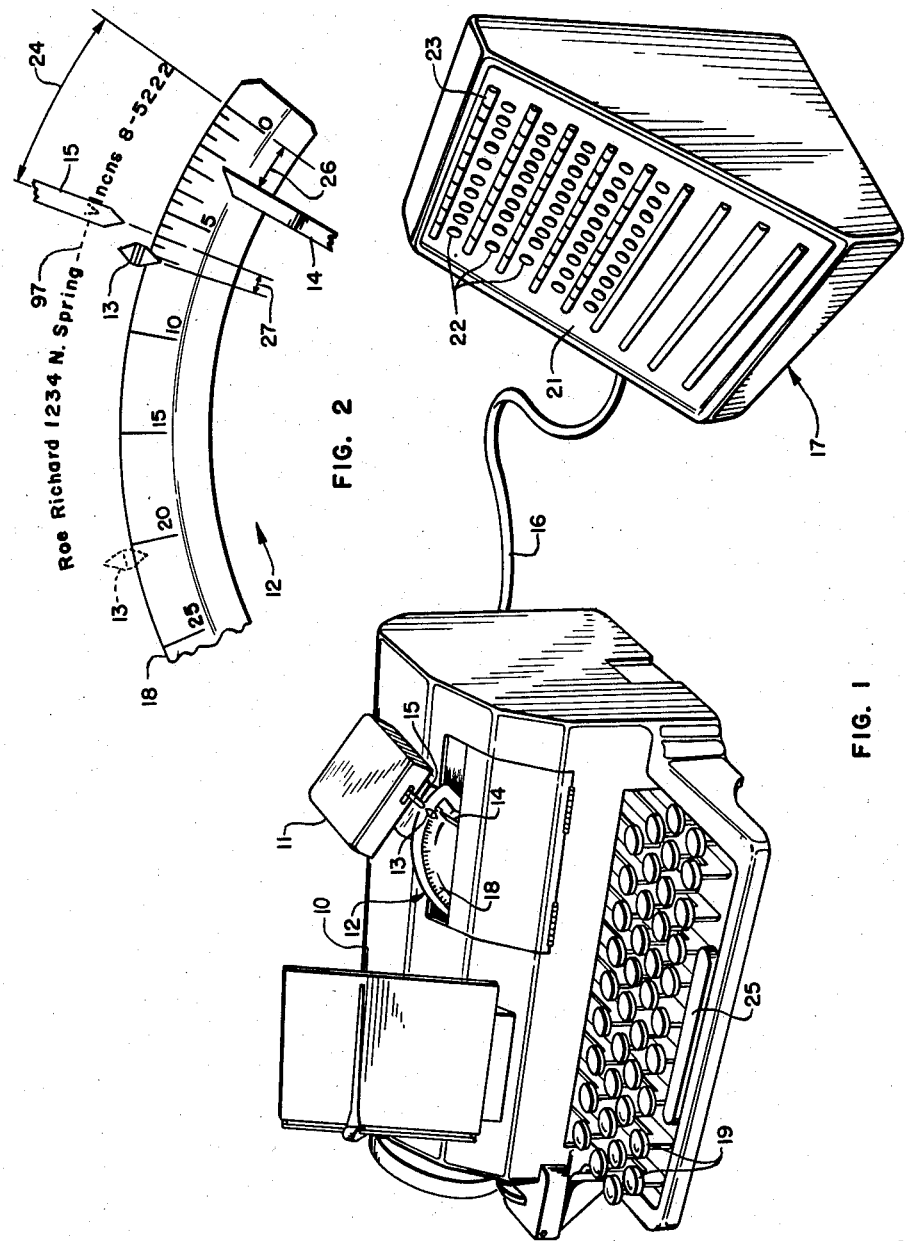
INVENTORS
MAURUS T. GOETZ
RALPH H. HALVORSEN
BY Emery Robinson
ATTORNEY June 10, 1958 M. T. GOETZ ET AL 2,838,114
KEYBOARD PERFORATOR AND COUNTER FOR SETTING TABULAR MATTER
Filed Aug. 29, 1955 3 Sheets-Sheet 2
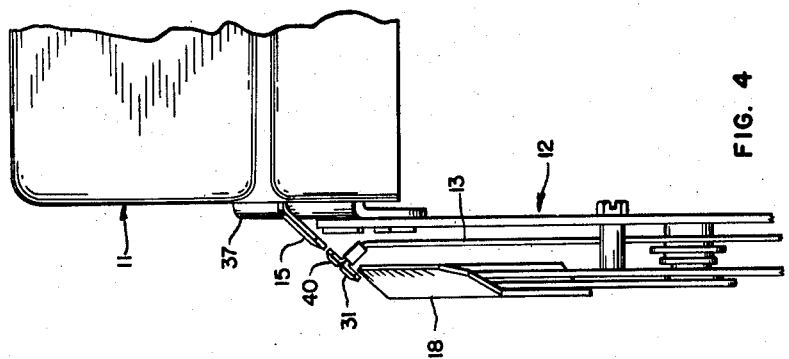
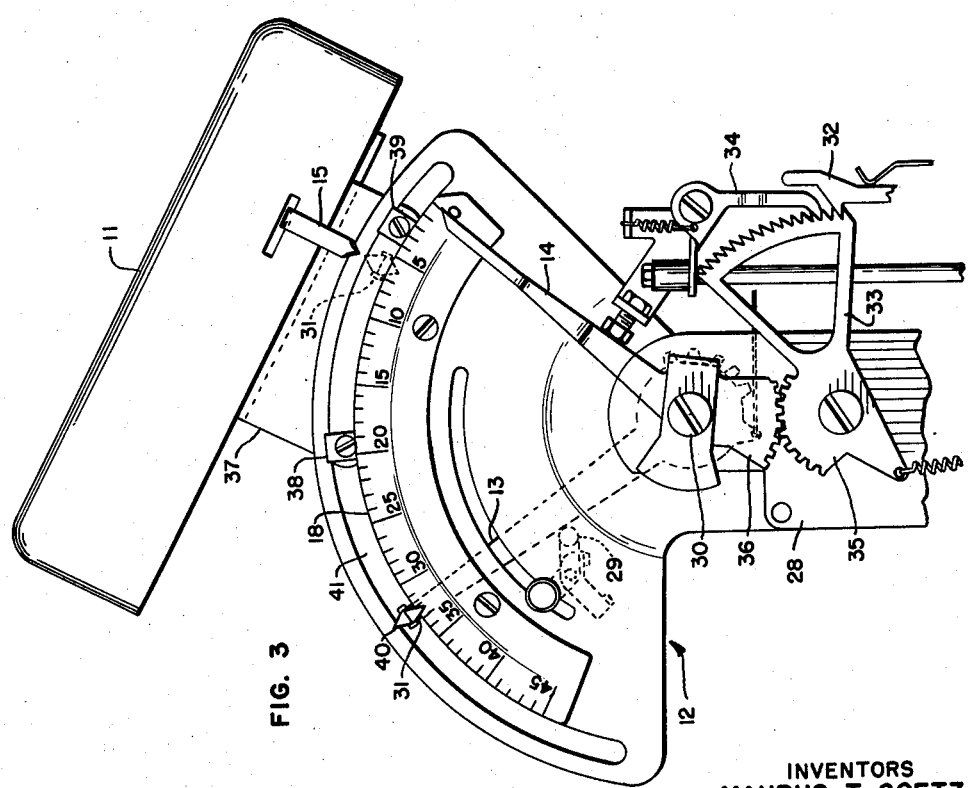
INVENTORS
MAURUS T. GOETZ
RALPH H. HALVORSEN
BY *Emery Robinson*
ATTORNEY INVENTORS
MAURUS T. GOETZ
RALPH H. HALVORSEN
BY Emery Robinson
ATTORNEY

United States Patent Office 2,838,114
Patented June 10, 1958

2,838,114

KEYBOARD PERFORATOR AND COUNTER FOR SETTING TABULAR MATTER

Maurus T. Goetz, Chicago, and Ralph H. Halvorsen, Des Plaines, Ill., assignors, by mesne assignments, to Fairchild Graphic Equipment, Inc., a corporation of New York Application August 29, 1955, Serial No. 531,232

3 Claims. (Cl. 164—112)

The present invention pertains to type setting systems and apparatus therefor and more particularly to perforators and counters which may be utilized for preparing a perforated strip for the automatic control of composing machines.

A primary object of the invention is to provide a rapid and efficient means for preparing justified lines of tabular matter for composing machines.

Another object of the invention is to provide a novel scale mechanism capable of indicating justifiability of a composed line of type matter in the middle of a line.

A further object of the invention is to provide pointer means to indicate to the operator prior to the punching operation, the length of the variable, but predictable, portion of a telephone directory listing.

It is believed that the structure constituting the present invention will be more clearly understood from the following description, taken in conjunction with the accompanying drawings, wherein:

Fig. 1 is a perspective representation of the elements embracing the present invention;

Fig. 2 is an enlarged scale diagram showing the relative pointer positions during the composition of a typical line of matter according to the present invention;

Fig. 3 is a front elevational view of the indicating mechanism;

Fig. 4 is a side view of the mechanism shown in Fig. 3;

Figure 5:
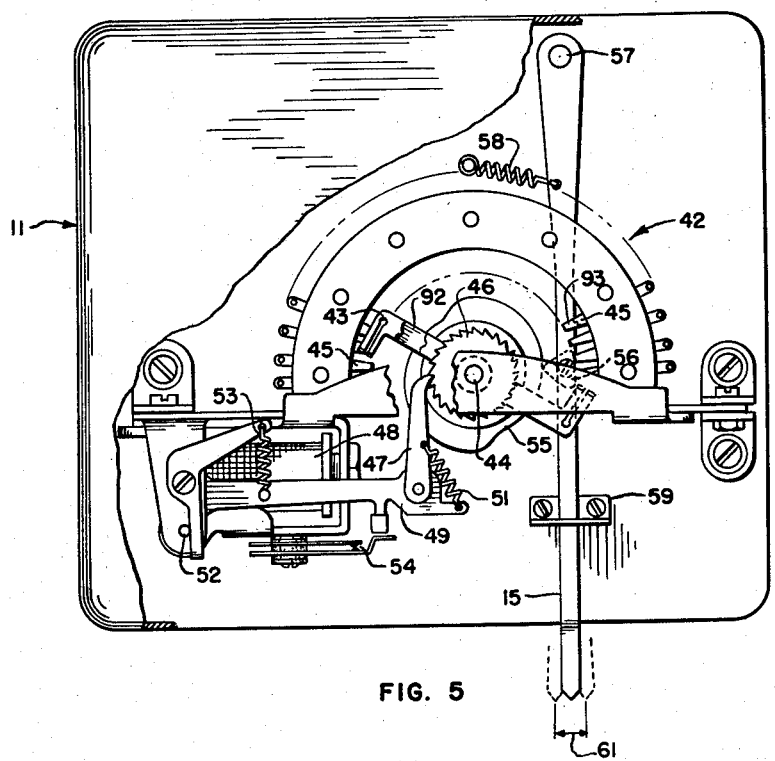
Fig. 5 is a top view of the auxiliary pointer mechanism according to the present invention.

In this specific embodiment herein described, the present invention is shown in Fig. 1 in connection with a keyboard perforator and counter 10 such as disclosed in United States Patent No. 2,059,250, modified to include an auxiliary pointer mechanism 11. The indicating mechanism described in said patent comprises a sectoral or fan-shaped dial 12 relatively movable to which are an index hand or matrix pointer 13, and a spaceband pointer 14. Cooperably related to the pointers 13 and 14 in a manner hereinafter described is the auxiliary or "exchange" pointer 15. The auxiliary pointer mechanism 11 is connected by a control cable 16 to an "exchange" control keyboard device 17.

The matrix pointer 13 is rendered variably movable along the arcuate edge of a scale 18 of dial 12 by means of a counting mechanism which is variably operated in accordance with the widths of the characters composed in the line, and which may be of the construction shown and described in said Patent No. 2,059,250. Briefly, the operation of the counting mechanism is controlled by a series of keys 19 arranged similarly to the familiar typewriter keyboard through the instrumentality of a selector mechanism contained within the base of the keyboard device. The exchange control board 17 is provided on the inclined front face thereof with a control panel 21, having arranged thereon a plurality of rows of keys 22. Above each key 22 is presented (at 23, for example) the name of the telephone exchange appertaining thereto. As an example, the control panel 21 may have 140 push buttons or keys 22, each button or key representing one exchange in the Chicago telephone directory.

The auxiliary pointer mechanism 11 has a pointer 15 which is shown in Fig. 1, but which is illustrated in larger scale in Fig. 2. The basic function of pointer 15 is to indicate, prior to the tape punching operation, the length of the telephone exchange and number which is to be perforated for the particular line in process. The setting of pointer 15 is controlled from the keys 22 of the control board 17. In setting telephone composition, the operator usually works from individual tickets received from the business office of the telephone company and turns these tickets over one at a time as the successive listings are composed on the perforator. As each ticket is thus turned over, the operator notes or reads the exchange number which will be required for the next line, and then presses the corresponding button 22 on the control board 17. This button 22, when operated, immediately activates the auxiliary pointer mechanism 11 (in a manner to be hereinafter described) to move the pointer 15 to a new position with regard to the scale 18, and in this new position the pointer 15 indicates the amount of space which that particular exchange will occupy in the line being set.

In Fig. 2, is shown a typical line (as it would appear in the telephone directory) after the exchange indicator pointer 15 has been set to indicate the space in that line which will be occupied by the exchange and number; namely, Vincennes 8–5222. The operator is then in a position to operate the keyboard of the perforator and counter 10 in setting the name and address followed by a sufficient number of leaders to bring the matrix pointer 13 to the approximate position shown in Fig. 2.

In the portion indicated 24 (Fig. 2) no spacebands are used, these portions being made up entirely of matrices of fixed thicknesses; namely, the matrices carrying alphabetical and numerical characters, and the em and/or en quads as spacers. Therefore, the spacebands are introduced into the line only in the address portion of the line so that in the process of justification, wherein the spacebands are expanded to spread the line, the exchange and number portion 13 will be formed to the right (as viewed in Fig. 2).

In the present embodiment of the invention, the pointer 14 is movable, upon each operation of the space key 25 (Fig. 1), a distance commensurate to the expansibility of the spaceband, so that at any time, the distance 26 is indicative of the cumulative expansibility of the spacebands in the line. Also, upon each operation of the space key 25, the matrix pointer 13 is moved a distance corresponding to the minimum thickness of the spaceband. It will be observed that in the position shown in Fig. 2, the distance 27 between the matrix pointer 13 and the exchange pointer 15 is less than the expanse or distance 26, and it is therefore obvious that this line would justify after the exchange listing has been perforated.

As shown in Fig. 3, the dial 12 is mounted on bracket 28. Scale 18 is provided along its arcuate edge with a series of graduations, which represent units of type measure, and is adapted to count proportions, and not actual dimensions; thus rendering the apparatus adaptable for use with any size or font of type. The length of line to be composed is predetermined and is represented by the distance between pointer 13 (when it abuts adjustable stop 29) and the zero position on the scale. Thus, the adjustable stop 29 and the zero position on the scale cooperate to define the range of movement of the matrix pointer 13. Upon the depression of a key the reverted end 31 of the matrix pointer 13 moves along the edge of the scale 18 from left to right towards zero in response to the totalization or accumulation of the matrix thicknesses by the counting mechanism shown in the aforesaid Patent No. 2,059,250. Thus, the distance from the reverted end 31 to zero at any instant indicates the amount of space left in the line to be filled. The pointer 13 is also provided with a reverted end 40 cooperable with pointer 15 to facilitate the reading of justification.

Cooperating with the matrix pointer 13 is the justification pointer 14 which is moved in incremental amounts indicative of the expansibility of the spaceband, upon each operation of the space key 25 (Fig. 1). The incremental movement of pointer 14 to the left is accomplished by the following described mechanism wherein a pawl 32 coacting with a ratchet segment on member 33 is connected to the space key 25. The depression of the space bar or key 25 imparts a downward movement to the pawl 32 and causes the ratchet member 33 to rotate one step or unit angular distance equivalent to one tooth and to be held thereat by a holding pawl 34. A corresponding movement is imparted to justification pointer 14 through the instrumentality of gear segments 35 and 36. The pointers 13 and 14 are mounted pivotally on a common pivot 30. The gearing 35 and 36 is so chosen as to impart a movement to justification pointer 14 such that each time the ratchet member 33 is stepped one tooth, the pointer 14 will be moved a distance corresponding to the expansibility of the spaceband.

The auxiliary indicating mechanism 11 is mounted on a bracket 37 fixed at an appropriate angle (as shown) to the dial 12 of the principal machine 10 by means of clamps 38 and 39. The clamps 38 and 39 are fixed within the arcual slot 41, in the member 12 which enables the entire mechanism 11 to be moved for adjustment purposes.

As shown in Fig. 5, the auxiliary indicating mechanism 11 comprises a stepping switch 42, wherein a wiper arm 43, fixed to a shaft 44, is adapted to traverse in a step-by-step manner a plurality of radially arranged contacts 45. Fixed to shaft 44 is a ratchet wheel 46, with which a pawl 47 cooperates to impart rotation in a step-by-step manner to said ratchet 46 under the control of a stepping magnet 48. Pawl 47 is carried pivotally on the armature 49 of magnet 48 and is normally biased clockwise into cooperative engagement with ratchet 46 by a spring 51. Armature 49 is mounted pivotally on a pivot 52 and is biased counterclockwise by a spring 53. Cooperatively associated with the armature 49 is a contact 54 which controls the buzzing action of magnet 48 as will be hereinafter described.

Also fixed to shaft 44 is a cam 55 adapted to cooperate with a cam follower portion 56 carried on the exchange pointer arm 15. Pointer arm 15 is mounted pivotally on a pivot stud 57 and is normally biased in a clockwise direction (as viewed in Fig. 5) by a spring 58 to maintain the cam follower 56 constantly in contact with the peripheral edge of cam 55. The forward end of pointer 15 is suitably guided in a guide member 59.

As previously observed, the distance 24 (Fig. 2) represents the variable, but predictable, portion of the telephone listing; namely, the exchange and number. Thus, the distance 24 is variable between the shortest exchange name and longest exchange name. Accordingly, the pointer 15 need move only a distance which corresponds to the difference between the shortest and longest exchange names. It is understood that under existing telephone practice the numeral portion of the exchange listing contains a fixed number of digital positions.

With the auxiliary indicating mechanism according to the present invention, the arm 15 is moved by the cam 55 a distance 61 (Fig. 5) indicative of the difference between the longest and the shortest telephone exchange and number listing. Accordingly, the peripheral contour of cam 55 is such that the pointer 15 will oscillate the distance 61. It is noted that the cam 55 has two similar halves, whereby one half is effective during each complete telephone listing. It is understood, of course, that in the event the variation between the longest and shortest exchange listing (exemplified by distance 61) becomes greater or smaller, a new cam 55 would be supplied.

A control panel 17 adapted for use with a system for preparing a telephone directory (for example, for Chicago) would have 140 push buttons or keys 22, each key 22 representing one exchange in the directory. The 140 exchanges included in said directory would be divided, for example, into 20 groups; each group embracing those exchanges having substantially equal matrix width counts. Each group would then be assigned one contact position 45 on the stepping switch 42. As indicated previously, preparatory to perforating a listing in the tape, the operator depresses the key 22 corresponding to the exchange in the particular listing being processed, identified on the control panel 17 by the inscription 23 above the selected key 22. Since the cam 55 and wiper arm 43 are fixed to the same shaft 44, the cam 55 will also be rotated to the proper angular position to set the pointer 15 so as to establish a distance 24 (Fig. 2) corresponding to the exchange key 22 which was depressed.

Figure 6:
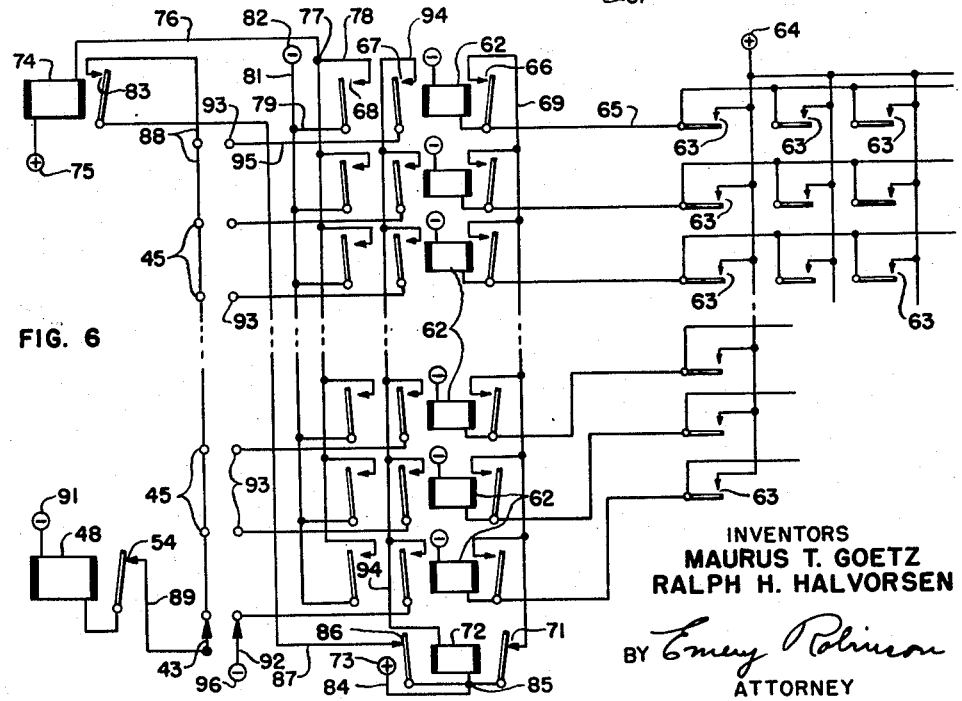
Fig. 6 is a circuit diagram according to the present invention.

Having reference to the circuit arrangement shown in Fig. 6, there are provided a plurality of relays 62, one for each of the groups into which the total number of exchanges in a given city or town are divided, as above indicated. Electrically connected to each relay 62 are a plurality of contacts 63, one for each key 22 in the horizontal row identified with said group relay 62. That is, each horizontal row of keys 22 in the control board 17 is identified with a group relay 62, and each key 22 in said row has operably connected thereto a contact 63.

In Fig. 6, it is observed that by closing a contact 63 (upon actuation of a key 22), a circuit is completed for the energization of the associated group relay 62 over a circuit extending from positive battery 64 through contact 63 (now closed momentarily), over conductor 65, and through the winding of relay 62 to negative battery. The group relay 62 that has thus become operated, closes its contacts 66, 67 and 68. Contact 66 upon closing establishes a locking circuit for relay 62 extending from negative battery, through the winding of relay 62, through contact 66 (now closed), over conductor 69, through contact 71 (now closed) of relay 72 over conductor 84 to positive battery 73.

Upon the closure of contact 68, an energizing circuit is completed for relay 74 extending from positive battery 75 through the winding of relay 74, over conductor 76 to junction 77, over conductor 78, through contact 68 (now closed) and over conductors 79 and 81 to negative battery 82. The energization of relay 74 effects the closure of its contact 83 to complete a circuit from positive battery 73, over conductor 84 to junction 85, then through contact 86 (now closed) of relay 72, over conductor 87, through contact 83 (now closed), over conductor 88 which serially connects the contacts 45 (of the step-by-step switch 42), through wiper arm 43, over conductor 89, through contact 54 (now closed) of stepping magnet 48, and through the winding of magnet 48 to negative battery 91. Stepping switch 48 thus becomes energized and opens its contact 54, whereupon magnet 48 is immediately de-energized. Buzzer-like operation is now started (in well known manner) and will continue until battery 73 is cut-off or removed from magnet 48 as will presently appear.

Also affixed to shaft 44 (Fig. 5) is a second wiper arm 92 which is adapted to traverse a second series of contacts 93 (analogous to contacts 45). However, contacts 93 are not connected in series, as are contacts 45, but are arranged in the manner shown in Fig. 6. The operation of the magnet 48 drives the wiper arms 43 and 92 and also cam 55 which are affixed to shaft 44. The wiper arms 43 and 92 have a fixed relationship on the shaft 44 and travel together.

As previously mentioned, the relay 62, when energizing, also closed its contact 67 to condition a circuit for arresting the wiper arms 43 and 92 at the segment or contact 93 corresponding to the exchange selected. Said circuit extends from positive battery 73, over conductor 84 to junction 85, then through the winding of relay 72, over conductor 94, through contact 67 (now closed), and over conductor 95 to the segment or stepping switch contact 93 of the selected group. Now, when the wiper arm 92 arrives at the selected segment or contact 93 a circuit will be completed, for energizing the relay 72, extending from negative battery 96, through the wiper arm 92, through contact 93 (of the selected group), over conductor 95, through contact 67 (still closed), over conductor 94, through the winding of relay 72, over conductor 84, to positive battery 73.

Relay 72, upon energizing will open its contacts 71 and 86. The opening of contact 86 breaks the afore-described energizing circuit for the stepping magnet 48, thereby arresting the movement of the wiper arms 43 and 92 at the selected segment or contacts 45 and 93, respectively, corresponding to the selected exchange group. Substantially simultaneously, upon the opening of contact 71, battery is removed from the previously described locking circuit for the selected group relay 62, causing the contacts 66, 67 and 68 associated with the group relay 62 to open. The opening of the previously operated contact 68 will break the energizing circuit for relay 74 causing its contact 83 to open. The opening of contact 67 breaks the circuit for relay 72 permitting it to close its contacts 71 and 86, the closing of which at this time will have no effect on relays 62 and magnet 48 because contacts 66 and 83, respectively, are also open. The function of relay 74 is to make certain that battery is removed from stepping magnet 48 and thus prevent the wiper arms 43 and 92 from over-traveling and missing the selected exchange segments 45 and 93, respectively.

The cam 55 which is fixed to the shaft 44 with wiper arms 43 and 92, has thus been rotated to a position whereat the pointer 15 will register a distance 24 indicative of the portion of the line which the exchange and number of a predetermined telephone listing will occupy. Therefore, in the further operation of the arrangement according to the invention, the operator will now operate the keys 19 (after the pointer 15 has been set according to the width of the column or line representing the telephone listing) to perforate in the tape the name and address of the telephone subscriber. The pointer 13 (Fig. 2) will move toward the right to indicate the cumulative thicknesses of the matrices and thin end of spacebands in the manner disclosed in 2,059,250, also adding thereto the widths of the leaders 97 (Fig. 2). In response to each operation of the spaceband key 25, the pointer 14 will move to the left incrementally a distance equal to the expansibility of the spaceband, so that the total expansibility of the accumulated spacebands in the line is represented by the distance 26. Now, the operator includes a sufficient number of leaders in the line until the distance 27 is equal to or less than the distance 26. Then the operator knows that the line just set up (or perforated) will justify, and completes the line by adding the exchange listing whereupon he will depress or operate the elevator key, as is well known in line composing operation. With the arrangement according to the present invention, the wiper arms 43 and 92 are stepped directly from one exchange setting to the next.

Although the present invention has been disclosed in connection with a specific embodiment thereof, it is, of course, understood that the invention is capable of embodiment in many forms other than that specifically disclosed without departing from the spirit and scope of the invention.

What is claimed is:

1. In combination with a keyboard perforator suitable for the production of perforated tape representing lines of composition comprising consecutive characters and expansible word spacers, a series of keys, a scale, a pointer, means for moving said pointer variably with respect to said scale in response to the operation of said keys to indicate the cumulative widths of characters, additional pointer means, a space key, means for moving said additional pointer means a predetermined distance upon each operation of said space key to indicate the cumulative expansibility of the word spacers, a special pointer cooperably associated with said other recited pointers, means for governing the movement of said special pointer, and control facilities for controlling said governing means, whereby said special pointer is positioned within predetermined limits with respect to said other pointers to indicate at all times the justifiability of the line being composed.

2. In combination with a keyboard perforator suitable for the production of perforated tape representing lines of composition comprising consecutive characters and expansible word spacers, a series of keys, a scale, a pointer, means for moving said pointer variably with respect to said scale in response to the operation of said keys to indicate the cumulative widths of characters, additional pointer means, a space key, means for moving said additional pointer means a predetermined distance upon each operation of said space key to indicate the cumulative expansibility of the word spacers, a special pointer cooperably associated with said other recited pointers, cam means for governing the movement of said special pointer, a stepping switch device for controlling the operation of said cam means, and electrical circuit means for determining the extent of operation of said stepping device, whereby said special pointer is positioned within predetermined limits with respect to said other pointers to indicate at all times the justifiability of the line being composed.

3. In combination with an apparatus for the production of perforated tape representing lines of composition comprising consecutive characters and expansible word spacers, a series of keys, a scale, a pointer, means for moving said pointer variably with respect to said scale in response to the operation of said keys to indicate the cumulative width of characters, additional pointer means, a space key, means for moving said additional pointer means a predetermined distance upon each operation of the space key to indicate the cumulative expansibility of the word spacers, a special pointer cooperably associated with said other recited pointers, cam means for governing the movement of said special pointer, electromagnetically operated means for controlling the operation of said cam means, and control facilities for determining the extent of operation of said electromagnetically operated means, whereby said special pointer is positioned within predetermined limits with respect to said other pointers to indicate at all times the justifiability of the line being composed.

References Cited in the file of this patent

UNITED STATES PATENTS 2,059,250    Krum _____ Nov. 3, 1936